Dec. 18, 1934.  W. O. WINGARD  1,984,509
AUTOMATIC STEAM RADIATOR VALVE
Filed Jan. 12, 1934
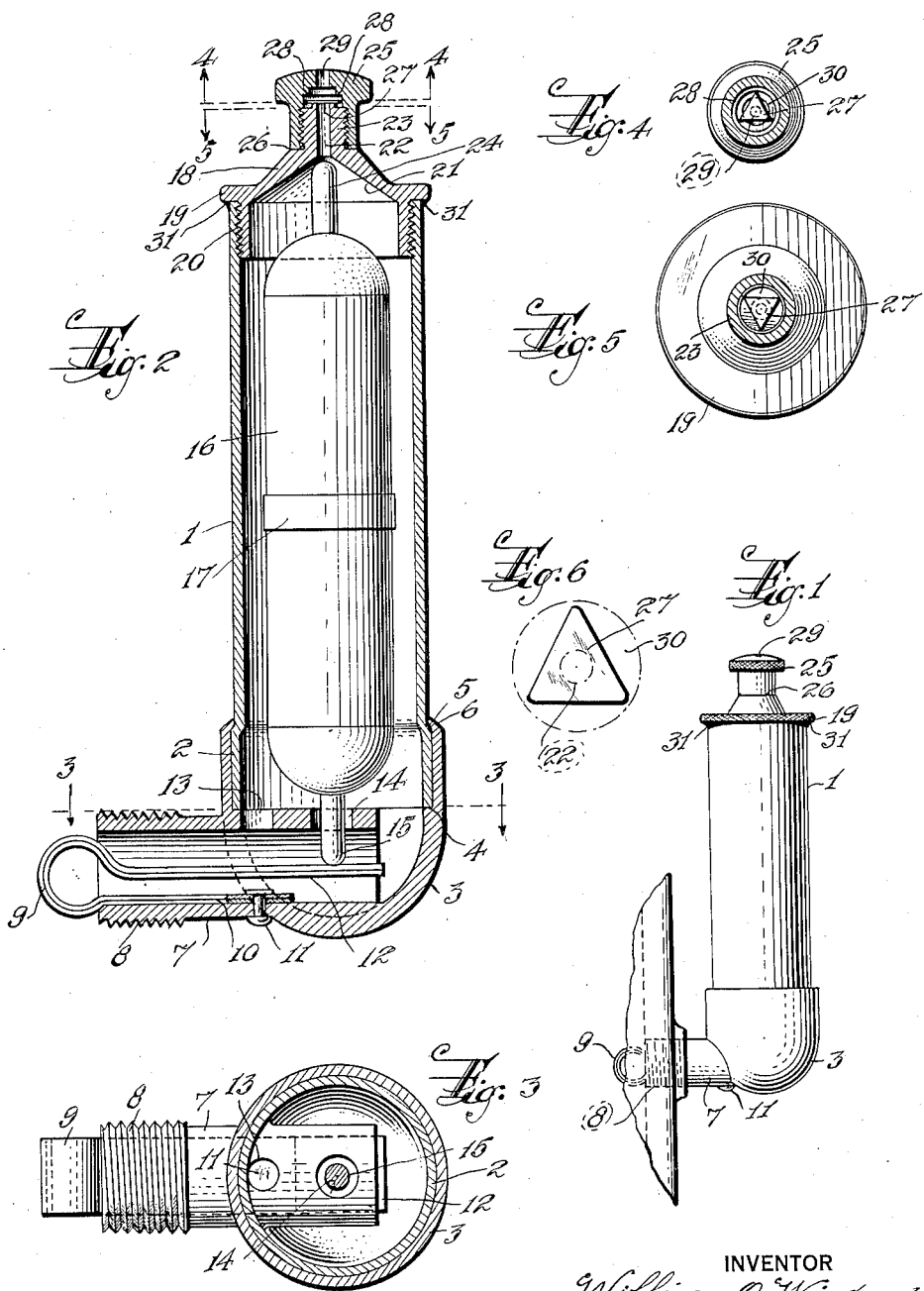
INVENTOR
William O. Wingard
BY
A. D. T. Libby
ATTORNEY Patented Dec. 18, 1934

1,984,509

UNITED STATES PATENT OFFICE 1,984,509

AUTOMATIC STEAM RADIATOR VALVE

William Oscar Wingard, Irvington, N. J.

Application January 12, 1934, Serial No. 706,313

14 Claims. (Cl. 236—62)

This invention relates to an automatic air valve for use in connection with steam radiators.

It is one of the objects of my invention to provide an improved type of valve which is sensitive to the temperature changes in the radiator, whereby the cold air therein may be vented from the radiator in a better and more expeditious manner than heretofore, thereby allowing a very low pressure of steam to come into the radiator to heat the same.

While obtaining the principal object of my invention, it is a further object to provide a radiator valve which is neat in appearance, yet highly efficient and positive in its operation, and one that is simple in construction and therefore relatively cheap to manufacture.

My improved type of valve will be readily understood by reference to the annexed drawing, wherein:

Figure 1 is an approximately full-size view of the valve attached to the radiator.

Figure 2 is a vertical sectional view through the valve on an enlarged scale.

Figure 3 is a view on the line 3—3 of Figure 2.

Figure 4 is a view on the line 4—4 of Figure 2, with one of the valve parts in one position of operation.

Figure 5 is a view on the line 5—5 of Figure 2, with the valve part of Figure 4 in another position of operation.

Figure 6 is a view of said valve part referred to in Figures 4 and 5, but on an enlarged scale.

In the drawing, 1 is a tubular shell having its lower end 2 arranged to make a force or press-fit into the bowl 3 terminating against an annular shoulder 4. Preferably, the portion 2 of the tube 1 is expanded at the point 5 so that the upper rim 6 of the bowl 3 can be spun over the expanded portion or seat 5, thereby forming an air and water-tight joint at this point without any soldering or brazing being required.

The bowl 3 is provided with a nipple 7 preferably integral therewith, although it may be made in a separate piece. The nipple has threads 8 for screwing into a radiator. Positioned in the nipple 7, is a bi-metallic element 9. One arm or portion 10 of the thermostat 9 is permanently fastened to the nipple 7 of the bowl 3 in any satisfactory manner as by a rivet 11, which rivet is put through a hole in the arm 10 before the thermostat element 9 is inserted in the nipple 7, the arm 12 of the thermostat element being spread sufficiently to insert the rivet 11 into the hole in the arm 10, after which the arm 12 is forced back into normal position and the thermostat member 9 inserted in the nipple.

A tool, which may be in the shape of a drill rod, is then inserted through the upper end of the tube 1 through a hole 13 in the nipple which is positioned directly opposite the rivet 11. The drill rod thus acts as an anvil against the arm 12, bearing against the head of the rivet 11, whereby the rivet may be upset on the outside, thus securing the thermostat element 9 in position.

The inner end of the nipple 7 is provided with an orifice 14 within which a pin 15 is located, the inner end of the pin 15 normally resting against the arm 12 of the thermostat element 9. The pin 15 is carried by a float member 16 which, as indicated, is made of two cylindrical portions of suitable metal such as thin sheet copper, the portions being joined together at the band portion 17 in any satisfactory manner as by soldering or brazing.

Closing the upper end of the tube 1, is a cap 18 having a knurled flange 19 and threads 20 to fit corresponding threads in the tube 1 to make an air and water-tight joint at the outer end of the tube. The seat for the flange 19 on the tube 1 may be increased somewhat by flaring the outer rim 31 of the tube 1. The inner surface of the cap 18 has a conical surface 21, at the apex of which there is an opening 22 leading through the threaded projection 23. The upper end of the float 16 is provided with a pin 24, preferably a duplicate of the pin 15, and as the float 16 is raised in a manner to be hereinafter described, the pin 24 engages a seat at the inner end of the opening 22 to close this opening.

Fitting on the threaded projection 23, is an auxiliary cap 25 threaded interiorly to fit the threads on the projection 23. The skirt of the auxiliary cap 25, when it is screwed all the way down, engages an annular shoulder 26 on the cap 18. The upper end of the stem or projection 23 has a flat surface and normally resting on this flat surface is a valve member 27. The member 27 is preferably in the shape of an equilateral triangle having somewhat dull corners so as not to dig into the metal of the auxiliary cap 25.

I have found from many tests that I get excellent results by making the valve member 27 of suitable metal, such as phosphour bronze, about .007" in thickness. Between the flat surface on the end of the stem 23 and the annular seat 28, I provide a small clearance of approximately .020" to .025" so that the valve member 27 can move this distance from the flat surface of the stem 23 against the annular shoulder 28 on the auxiliary cap 25 which is provided with an exit opening 29.

Coming now to the operation of my valve, let it be assumed that there is no steam in the radiator and nothing but cold air. The valve 27 will then be resting against the flat surface at the top of the stem 23, thereby closing the opening 22. As steam is gotten up in the heating system, it will start to come into the radiator and the pressure against the cold air will force this through the nipple 7, past the float 16, and through the opening 22, to raise the very light valve 27 from its seat, and because of the triangular shape of the valve 27, the air will pass by it through the three spaces 30 indicated by dotted line in Figure 6. I have found that a very slight pressure of steam will force the cold air out of the radiator in the manner described, so that the radiator is vented in a very efficient manner.

After steam comes in contact with the bimetallic thermal element 9, this member, which has been made to suit the character of the device, operates to raise, through the pin 15, the float 16, causing the pin 24 to engage on its seat to close the opening 22 somewhat before the arm 12 has reached its maximum amount of movement within the nipple 7. Thus the mechanism acts to prevent steam issuing from the radiator. As the thermostat element 9 cools off, the float 16 will drop and the cycle of operation is repeated.

In case the radiator is filled with water, which will tend to come out of the valve, the water enters through the nipple 7 within the tube 1, raising the float 16 to close the opening 22 as will be readily understood.

It happens many times that radiator valves become fouled up with dirt or scale from the pipes and radiator, and where the valves are made (as they usually are) so that they cannot be taken apart, the entire valve must be thrown away. It will be observed that my construction is such that the valve can be readily taken apart for cleaning it out, yet the parts are so constructed that steam and water-tight joints are obtained when these parts are again put together. Furthermore, since the float 16 is reversible, no care need be exercised as to which end of the float is inserted into the tube 1. Because of the arrangement and construction of the parts as described, I have obtained a radiator valve which attains all the objects heretofore set forth.

What I claim is:

1. A radiator valve device including, a casing having a threaded portion to be screwed into the radiator, a thermo-couple element mounted in said threaded portion and having a free movable end, a float within said casing and having a part resting on the free end of said thermo-couple element, a main cap for said casing having a threaded stem and a hole therethrough, an auxiliary cap having a hole therethrough and threaded onto said stem and having an annular recess spaced a short distance from the end of said stem when in position thereon, a thin, flat, triangular-shaped valve normally resting on the end of said stem when there is no steam pressure in the radiator but adapted to be lifted from said stem when pressure is applied to the stem side of the valve, said main cap having an interior seat around the said hole therethrough, and means on said float for engaging said seat when the float is raised to close said hole.

2. A radiator valve device including, a casing having a threaded nipple for screwing into a radiator, a U-shaped thermo-couple element having one arm of the U fastened to the nipple, said nipple having an opening in its wall adjacent the end of the free arm of the U-shaped element, a float within the casing and having a pin extending through the opening in said nipple into engagement with the free end of the thermo-couple element, a main cap for closing said casing and having an exteriorly threaded stem with a hole therethrough, a pin on said float for closing said hole when the float is raised, an auxiliary cap threaded to fit said stem and having a chamber therein and a hole leading from the chamber to the exterior of the cap, and a thin, flat, irregularly shaped valve positioned within said chamber and adapted to rest over the opening in said stem when there is no pressure against its stem surface.

3. A radiator valve device as set forth in claim 2, further characterized in that said float is made so as to be reversible in the casing.

4. A radiator valve device including, a casing having an extension for connection to a radiator, a thermo-couple element positioned in said extension and having a free movable end, a float in the casing having a part resting on said free end of the thermo element, a main cap for closing one end of the casing, said cap having an upwardly projecting stem with a hole therethrough, said float having a part to engage the interior of said cap to close said hole when the float is raised, an auxiliary cap to engage said stem, said auxiliary cap having a chamber when in position on the stem with a hole leading through the cap from the chamber, and a thin, flat valve member having an irregular contour, positioned in said chamber over the end of the stem.

5. A radiator valve device as set forth in claim 4, further characterized in that the interior surface of the main cap is conical in shape with said hole at the apex, whereby the said part on the float is readily guided to its seat, thereby closing the hole.

6. A radiator valve device as set forth in claim 4, further characterized in that the interior surface of the main cap is conical in shape with said hole at the apex, whereby the said part on the float is readily guided to its seat, thereby closing the hole, and further characterized in that said parts on the float are pins similarly formed, so the float is reversible.

7. A radiator valve device as set forth in claim 4, further characterized in that said thin valve member is of metal and in the shape of a triangle having dull corners as and for the purpose described.

8. A radiator valve device as set forth in claim 4, further characterized in that said chamber in the auxiliary cap is formed at least in part by an annular shoulder spaced a small distance from the end of said stem, whereby said thin valve will engage said annular shoulder as a stop when it is forced off the end of said stem as described.

9. A radiator valve device including, a casing having an extension for connection to a radiator, a thermo-couple element positioned in said extension and having a free movable end, a main cap for the casing having a hole for venting the casing, a float in the casing having a pin at one end resting on the free end of said thermo-element and a pin in the other end to close said hole in the cap when the float is raised, an auxiliary cap attached to the main cap and having a portion spaced a short distance from the main cap, a thin, flat valve member having an irregular contour and lying over the hole in the main cap and limited in its movement by said spaced portion on the auxiliary cap, which also has a vent hole therein.

10. A radiator valve device as set forth in claim 9, characterized in that the float is reversible and the main cap is conically formed on its interior to guide the upper pin on the float to its seat over the hole in the main cap, and further characterized in that said thin valve member is shaped so the cold air from the radiator may readily pass the valve when it is raised from its main cap seat.

11. In a device of the character described, a casing having a nipple for attaching the casing to a radiator, said nipple extending within the casing across the long axis thereof and having a guide hole in its wall, a float in said casing having a pin at each end, one of which is located in said nipple guide hole, closure means for one end of the casing and having a vent from the interior of the casing, a thin relief valve independent of said float positioned in said closure means for closing and opening said vent, the shape of the valve being such as to readily pass cold air from the radiator when the valve is raised from its seat, and a thermostatic element positioned in said nipple and having one arm thereof extending across the projection of said hole in the wall of the nipple, said arm being engaged by said float pin positioned in the nipple guide hole for operating said float to close said vent through the medium of the other float pin, this last-mentioned closure being independent of said valve and at a different part of the vent.

12. In a device of the character described, a casing having a threaded extension to be screwed into a radiator or the like, a thermostatic element projecting from said extension into the radiator, closure means for one end of the casing and carrying a vent for the interior of the casing, a thin, flat valve positioned in said closure means for closing and opening said vent, and a float in said casing adapted to be operated at certain times by said thermostatic element to close said vent as described.

13. A radiator valve device comprising a casing, a thermostatic element carried by the casing and extending into the radiator, an air valve carried at another part of the casing and in the path of a vent for the casing, a float within the casing and adapted to close and open said vent according to the action of said thermostatic element.

14. A radiator valve device as set forth in claim 11, characterized in that the float is reversible.

WILLIAM OSCAR WINGARD.